United States Patent
Uphues et al.

(10) Patent No.: US 11,353,007 B2
(45) Date of Patent: Jun. 7, 2022

(54) METHOD OF MOUNTING A NACELLE OF A WIND TURBINE AND ASSEMBLING SET OF PARTS OF A WIND TURBINE

(71) Applicant: General Electric Company, Schenectady, NY (US)

(72) Inventors: Ulrich Uphues, Salzbergen (DE); Hartmut Scholte-Wassink, Salzbergen (DE); Sjoerd van Steinvoren, Salzbergen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/004,100

(22) Filed: Aug. 27, 2020

(65) Prior Publication Data

US 2021/0062791 A1 Mar. 4, 2021

(30) Foreign Application Priority Data

Aug. 29, 2019 (EP) ..................................... 19194433

(51) Int. Cl.
*F03D 13/10* (2016.01)

(52) U.S. Cl.
CPC .......... *F03D 13/10* (2016.05); *F05B 2230/61* (2013.01)

(58) Field of Classification Search
CPC ..... B66C 23/207; B66C 23/68; B66C 23/185; B66C 1/108; F03D 13/40; F03D 13/00; F03D 13/10; F03D 80/50; F05B 2260/02; F05B 2230/61
See application file for complete search history.

(56) References Cited

U.S. PATENT DOCUMENTS

| | | | | |
|---|---|---|---|---|
| 8,230,802 B2* | 7/2012 | Siegfriedsen | ........... | B63B 35/44 114/268 |
| 8,313,266 B2* | 11/2012 | Numajiri | ................. | B63B 27/16 405/204 |
| 9,261,072 B2* | 2/2016 | Davis | ..................... | F03D 1/0675 |
| 9,410,528 B2* | 8/2016 | Westergaard | ........... | F03D 13/10 |
| 9,677,543 B2* | 6/2017 | Kamibayashi | .......... | F03D 13/10 |
| 10,156,223 B2* | 12/2018 | Bueno De Santiago | | B66C 23/185 |
| 10,781,798 B2* | 9/2020 | Trede | ....................... | F03D 80/85 |
| 2010/0232977 A1* | 9/2010 | Mogensen | ............ | F03D 7/0204 416/246 |
| 2011/0123274 A1* | 5/2011 | Soe-Jensen | ............. | B63B 27/16 405/195.1 |
| 2012/0045321 A1* | 2/2012 | Andersen | ................ | F03D 80/00 415/182.1 |

(Continued)

FOREIGN PATENT DOCUMENTS

| | | |
|---|---|---|
| EP | 3 242 014 A1 | 11/2017 |
| EP | 3 406 898 A1 | 11/2018 |
| EP | 3404259 A1 * | 11/2018 ........... B66C 23/185 |

OTHER PUBLICATIONS

EPO Search Report, dated Feb. 18, 2020.

*Primary Examiner* — Jason L Vaughan
(74) *Attorney, Agent, or Firm* — Dority & Manning, P.A.

(57) ABSTRACT

A method of mounting a nacelle of a wind turbine and at least one component of the wind turbine on a tower of the wind turbine, the method including hooking a roof of the nacelle to a crane hook of a crane, hooking the at least one component to the crane hook of the crane, and lifting the roof of the nacelle together with the at least one component using the crane.

9 Claims, 6 Drawing Sheets

(56) References Cited

U.S. PATENT DOCUMENTS

| | | | | |
|---|---|---|---|---|
| 2012/0282064 A1* | 11/2012 | Payne | ............... | B63B 35/003 |
| | | | | 414/139.6 |
| 2013/0180444 A1* | 7/2013 | Harris | ............... | E02B 17/027 |
| | | | | 114/365 |
| 2016/0273515 A1* | 9/2016 | Bueno De Santiago | ............... | |
| | | | | B66C 23/185 |
| 2016/0369778 A1* | 12/2016 | Davis | ............... | E04H 12/342 |
| 2018/0320665 A1* | 11/2018 | Lieckfeldt | ............... | F03D 80/82 |
| 2018/0335023 A1* | 11/2018 | Trede | ............... | F03D 80/80 |

\* cited by examiner

METHOD OF MOUNTING A NACELLE OF A WIND TURBINE AND ASSEMBLING SET OF PARTS OF A WIND TURBINE

FIELD

The present subject matter relates generally to wind turbines, and more particularly to a method of mounting a nacelle of a wind turbine and at least one component of the wind turbine on a tower of the wind turbine, and to an assembling set of parts of a wind turbine, to be hooked together on a crane hook of a crane.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Installing, repairing or replacing a component of a wind turbine, such as a drivetrain, a drivetrain component and/or a transformer, requires cranes to lift the components and sections of the nacelle to or from a tower of the wind turbine.

However, the use of cranes with a sufficient lifting capacity in the aforementioned installation, repair or replacement procedures can be cumbersome. Moreover, very low thresholds for the wind speed may apply, making the whole process even more time-consuming, even in case of the presence of merely low wind speeds.

Accordingly, the present disclosure is directed to a method of mounting a nacelle of a wind turbine and at least one component of the wind turbine on a tower of the wind turbine in installation, repair or replacement procedures.

BRIEF DESCRIPTION

Aspects and advantages of the invention will be set forth in part in the following description, or may be obvious from the description, or may be learned through practice of the invention.

In one aspect, the present disclosure is directed to a method of mounting a nacelle of a wind turbine and at least one component of the wind turbine on a tower of the wind turbine, the method including hooking a roof of the nacelle to a crane hook of a crane, hooking the at least one component to the crane hook of the crane, and lifting the roof of the nacelle together with the at least one component using the crane. It should be understood that the method may further include any of the additional steps and/or features as described herein.

In another aspect, the present disclosure is directed to a method of carrying a roof of a nacelle of a wind turbine and at least one component of the wind turbine to or from a base of the nacelle on a tower of the wind turbine, the method including connecting the at least one component to a lifting device, connecting the roof of the nacelle to a lifting device, and lifting the roof of the nacelle together with the at least one component using the lifting device.

In yet another aspect, the present disclosure is directed to an assembling set of parts of a wind turbine, to be hooked together on a crane hook of a crane, the assembling set including at least one component of the wind turbine; a roof of a nacelle of the wind turbine, the roof including an opening; a first connecting device for connecting the at least one component to the crane hook; and a second connecting device for connecting the roof to the crane hook; wherein the opening in the roof is positioned to allow the first connecting device to reach from the at least one component through the roof to the crane hook. It should be understood that the assembling set of parts may further include any of the additional features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
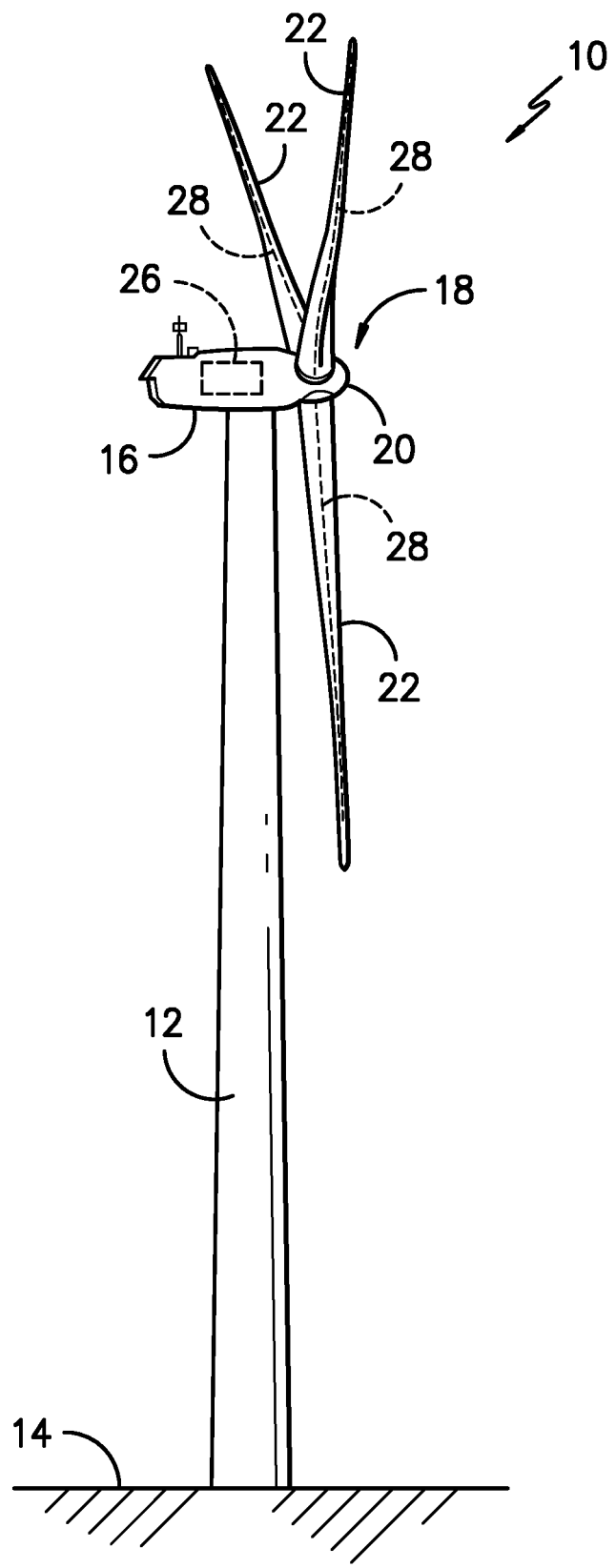
FIG. 1 illustrates a perspective view of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a wind turbine 10. As shown, the wind turbine 10 generally includes a tower 12 extending from a support surface 14, a nacelle 16 mounted on the tower 12, and a rotor 18 coupled to the nacelle 16. Thus, the nacelle 16 corresponds to the overall housing structure and has a bottom wall, opposing side walls, a front wall, a rear wall, and a top wall. Further, the front wall may have a main shaft opening configured to receive a main shaft 34 (FIG. 2) there through that is connectable to the rotor 18.

As shown in FIG. 1, the rotor 18 includes a rotatable hub 20 and at least one rotor blade 22 coupled to and extending outwardly from the hub 20. For example, in FIG. 1, the rotor 18 includes three rotor blades 22. However, in an alternative wind turbines, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other wind turbines, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several wind turbines, the controller 26 may include suitable computer-readable instructions that, when implemented, configure the controller 26 to perform various different functions, such as receiving, transmitting and/or executing wind turbine control signals.

Figure 2:
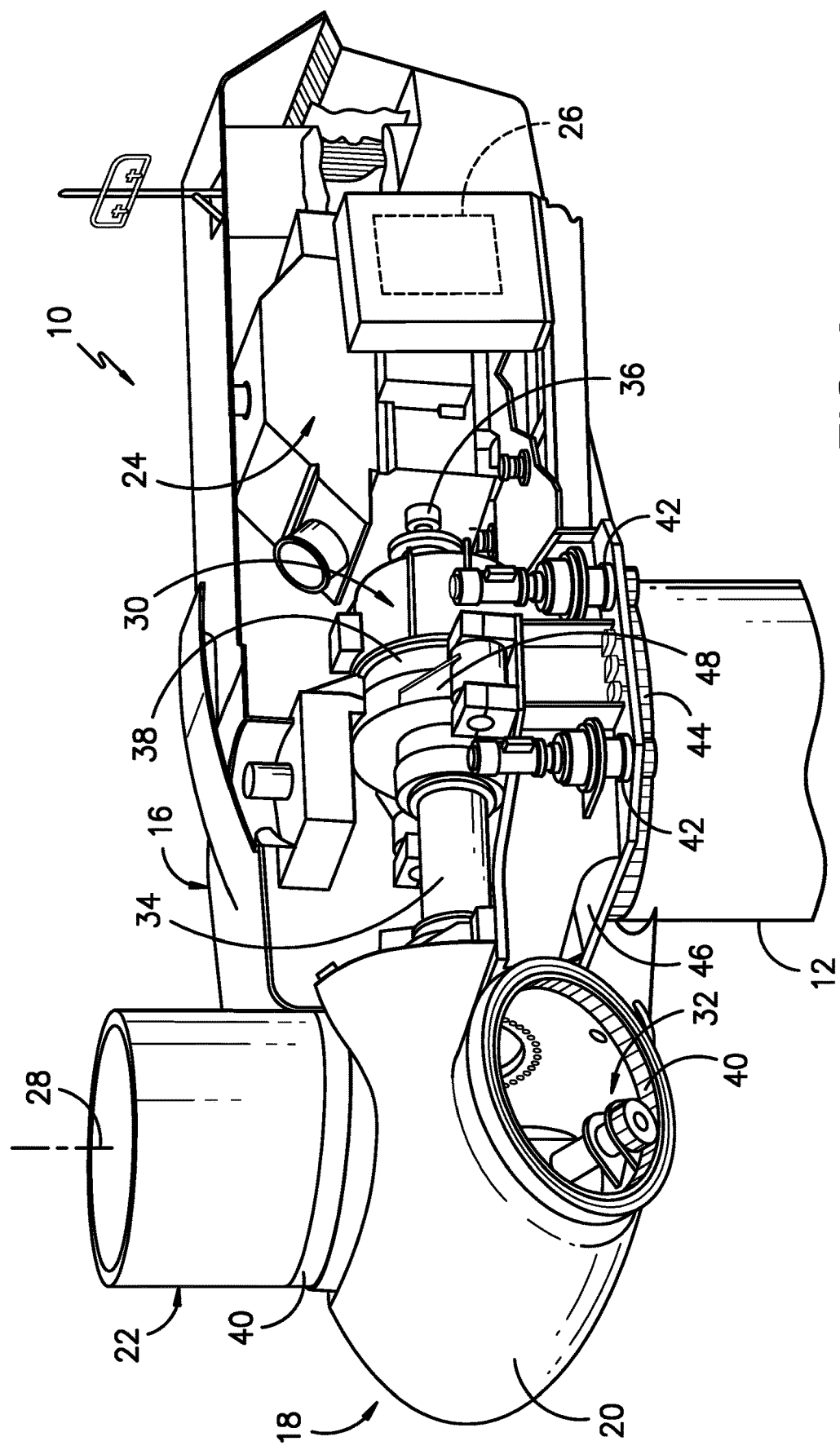
FIG. 2 illustrates a simplified, internal view of a nacelle of a wind turbine, particularly illustrating the nacelle during normal operation.

Referring now to FIG. 2, a simplified, internal view of an exemplary nacelle 16 of the wind turbine 10 shown in FIG. 1, particularly illustrating the drivetrain components thereof, is illustrated. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to the bedplate 46 by one or more torque arms 48. More specifically, in certain wind turbines, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and, thus, the generator 24.

Each rotor blade 22 may also include a pitch adjustment mechanism 32 configured to rotate each rotor blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10).

In some embodiments according to the present disclosure, a nacelle and wind turbine components positioned within the nacelle, including the drivetrain, can have a combined mass of more than 100 (metric) tonnes, particularly of more than 150 tonnes or 200 tonnes. In typical embodiments, the drivetrain of the wind turbine exceeds 100 (metric) tonnes, particularly of more than 150 tonnes or 200 tonnes.

In some embodiments, the wind turbine may be an onshore wind turbine. In several embodiments, the wind turbine may be an offshore wind turbine.

FIGS. 3-7 show a wind turbine, or an assembling set of parts of a wind turbine during mounting of a nacelle, or during carrying at least one component and a roof of a nacelle, according to embodiments described herein.

In several embodiments, a component of a wind turbine and a roof of a nacelle of the wind may be connected to, for example, hooked to or fixed at, a lifting device, particularly to a crane, such as a mobile crane, an offshore crane, especially to a crane hook of a crane. In some embodiments, the component and the roof may be lifted together using the lifting device.

Figure 3:
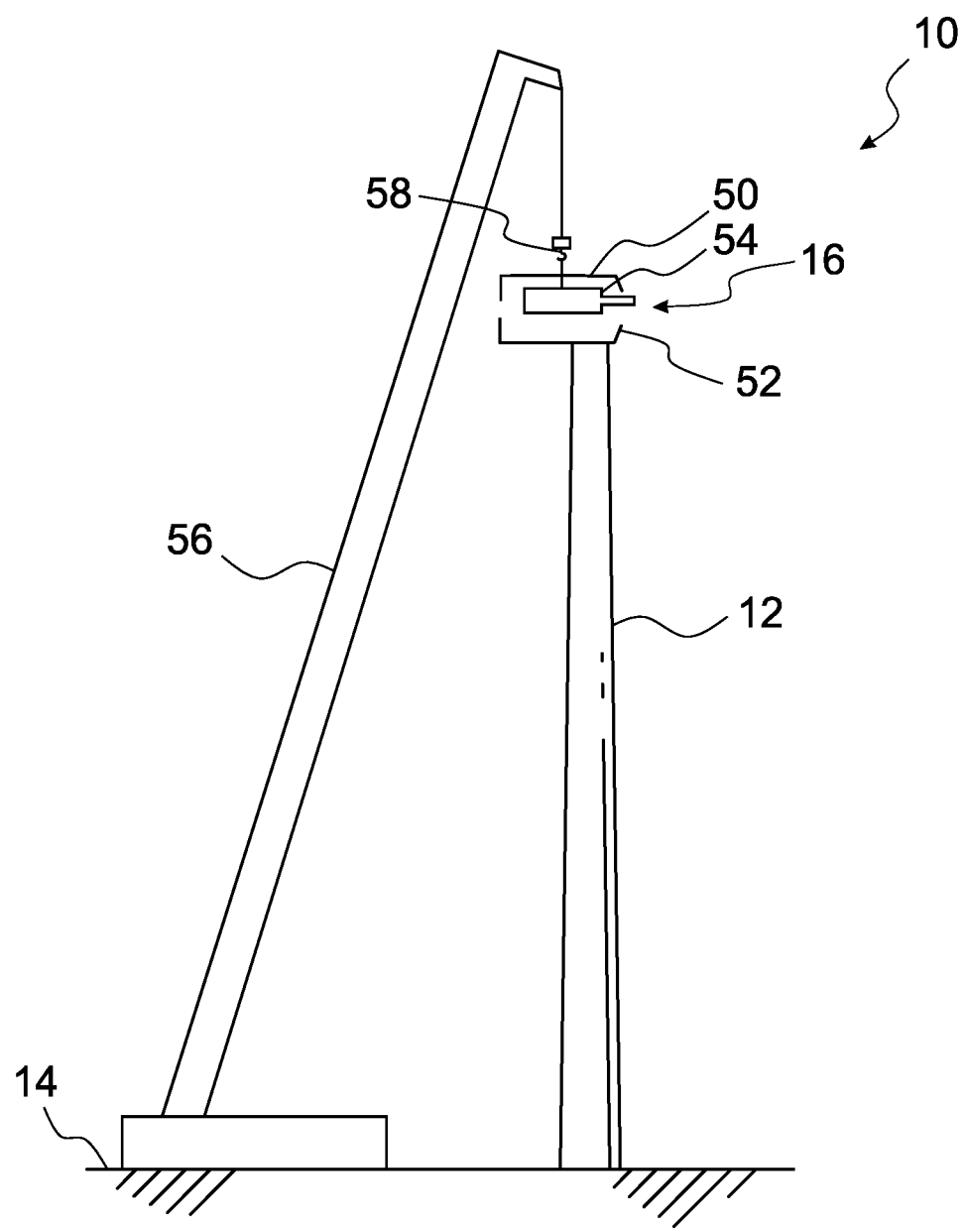
FIG. 3 illustrates a cross-sectional view of a wind turbine during mounting of a nacelle and a component on a tower of the wind turbine according to an embodiment of the present disclosure.

For example, as shown in FIG. 3, a roof 50 of a nacelle 16 and at least one component 54 of a wind turbine 10 are hooked to a crane hook 58 of a crane 56 and lifted using the crane 56.

In some embodiments, a component of a wind turbine can include a mechanical, electrical or electromechanical device, in particular associated with energy production or conversion. In embodiments, a component can include at least one of a drivetrain, a drivetrain component and a transformer. In particular, a drivetrain component may include a gearbox, a main shaft, a main bearing and/or a generator. In exemplary embodiments, a component can be heavier than 10 (metric) tonnes, in particular, heavier than 50 tonnes or heavier than 70 tonnes, and/or the component can be heavier than the roof.

In embodiments according to the present disclosure, a roof of a nacelle can form at least a part of a top wall of the nacelle. The roof may include at least one of: at least a part of a side wall, at least a part of a front wall, at least a part of a rear wall and at least a part of a bottom wall of the nacelle. The roof can have a weight of more than 0.3 tonnes, in particular, more than 0.5 tonnes or 0.7 tonnes, and/or less than 3 tonnes, particularly less than 2.5 tonnes or 2 tonnes. Lifting a roof together with a component might reduce the sensitivity of the lifting process to wind loading as compared to lifting the roof alone. With some embodiments, it might be possible to have more favorable wind speed thresholds for lifting.

In some embodiments, a nacelle may include a base coupled to a tower of the wind turbine. The base can include a bedplate and/or at least a part of the bottom wall of the nacelle. In some embodiments, the roof can be configured for mounting to a base of the nacelle, in particular using a releasable connecting device, e. g. by positive locking of the roof and the base or via a fastener such as a bolt.

In FIG. 3, the crane 56 may be any crane with a sufficient lifting capacity to lift the component 54 and the roof 50 to the top of a tower 12 of the wind turbine 10. The crane 56 may be positioned on a support surface 14 near the tower 12 or may be coupled to the tower 12. FIG. 3 shows the roof 50 and the component 54 lifted above a tower 12 of the wind turbine 10 and above a base 52 of the nacelle 16.

In embodiments, a crane hook may include a single hook as shown in FIGS. 3-6 and/or any lifting tool of a crane, including e. g. one or more hooks or shackles, a beam and/or a device for stabilizing or balancing the crane hook.

Figure 4:
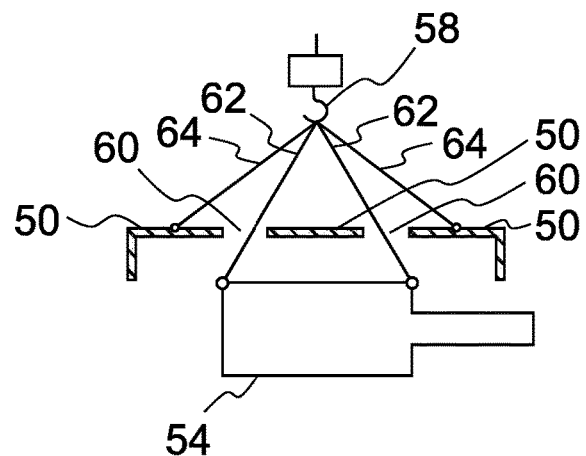
FIG. 4 illustrates a cross-sectional view of a roof of a nacelle and a component hooked to a crane hook according to an embodiment of the present disclosure.

FIG. 4 shows a component 54 and a roof 50 hooked to a crane hook 58. The component 54 is connected to the crane hook 58 using a first connecting device 62. The roof 50 includes an opening 60, which allows the first connecting device 62 to reach from the component 54 through the roof 50 to the crane hook 58. In particular, FIG. 4 shows an assembling set of parts of a wind turbine according to embodiments described herein in a hooked state.

In some embodiments, the roof can include at least two openings or at least three openings allowing, for example, a first connecting device to reach from the component through the roof to the crane hook. The openings may have a diameter of at least 10 cm, for example of at least 15 cm or of at least 20 cm. The opening might have a maximum diameter or maximum elongation of 100 cm or of 50 cm. The roof may be connected to the crane hook using a second connecting device.

Figure 5A:
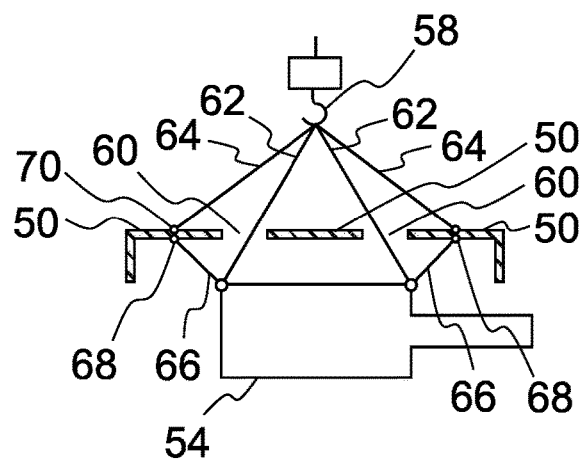
FIGS. 5A-B each illustrate a cross-sectional view of a roof of a nacelle and a component hooked to a crane hook according to embodiments of the present disclosure.
Figure 5B:
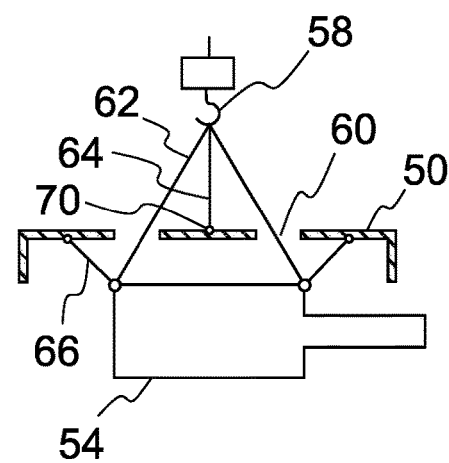

FIGS. 5A and 5B show a component 54 and a roof 50 hooked to a crane hook 58 in two exemplary configurations, wherein the roof 50 is connected to the component 54 using a third connecting device 66. The invention is not restricted to these two exemplary configurations.

In embodiments, the first connecting device, the second connecting device and/or the third connecting device may include a sling, a rope and/or a chain.

In several embodiments, the roof can include a fastening site on the inside of the roof. The fastening site on the inside of the roof can be configured as a fixation device, for a third connecting device, for connecting the roof to the at least one component. For instance, the fastening site may include a loop, a hook and/or a shackle. In particular, the roof may include at least two fastening sites or at least three fastening sites on the inside of the roof. In exemplary embodiments, the third connecting device might help to stabilize the roof and/or the component, e.g. during occurrence of wind. In further embodiments, no third connecting device is used or necessary.

In some embodiments, the roof is not fixedly mounted to the component during lifting. For instance, the connecting devices are normally flexible and do not provide a fixed connection. On the other hand, in a mounted nacelle ready for normal service, the roof is fixedly connected with components, e.g. by screws or bolts.

For example, FIGS. 5A and 5B each show the roof 50 with a fastening site 68 on the inside of the roof 50, wherein the fastening site 68 is configured and is used as a fixation device for the third connecting device 66.

In exemplary embodiments, the roof might include a further fastening site on the outside of the roof as a fixation device for the second connecting device.

In particular, FIG. 5A shows the roof 50 with two further fastening sites 70 connected to the crane hook 58 using two second connecting devices 64, whereas in FIG. 5B the roof 50 includes a single further fastening site 70 located centrally on the roof 50 and connected to the crane hook 58 using a single second connecting device 64.

It should be understood that the number and configuration of connecting devices including the first connecting device, the second connecting device and/or the third connecting device is not limited to the embodiments shown in FIGS. 4A and 4B. For instance, in some embodiments the number and configuration of connecting devices may be adapted depending on the loading capacity of the connecting devices or on the sensitivity of the roof to wind loading. Also, more than one first connecting device may reach through one opening.

Figure 6A:
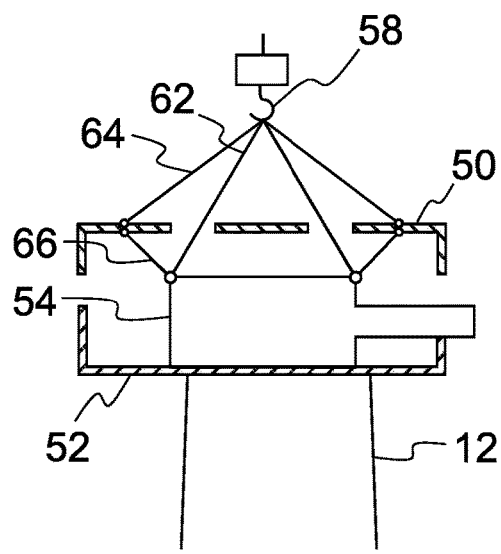
FIGS. 6A-B illustrate cross-sectional views of a roof of a nacelle and a component during mounting on a base of the nacelle on a tower of a wind turbine according to an embodiment of the present disclosure.
Figure 6B:
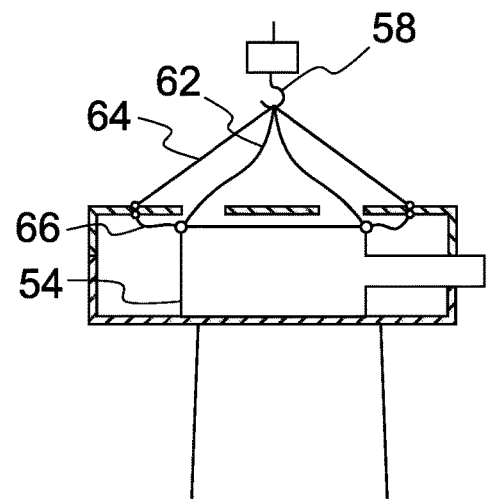

FIG. 6A shows an exemplary embodiment with a component 54 and a roof 50 hooked to a crane hook 58 and lifted to the top of a tower 12 with a base 52 coupled to the tower 12. In a hooked state, as shown in FIG. 6A, the load of the component and of the roof can be carried by the crane hook 58. In the hooked state shown in FIG. 6A, the component may be positioned and fixed in the base 52. After fixing the component 54, the crane hook 58 and the roof 50 may be lowered, as illustrated in FIG. 6B. In FIG. 6B, the crane hook may carry only the load of the roof 50. The first connecting device 62 and the third connecting device 66 may be in a relaxed state or might be removed. The roof 50 may further be positioned and fixed on the base 52 of the nacelle 16. After positioning and fixing, the component 54 and the roof 50 may be in a mounted state and positioned at a mounting distance.

In some embodiments, a first length of a first connecting device and a second length of a second connecting device may be configured such that in a hooked state, particularly in a hooked state of an assembling set according to embodiments described herein, at least one component and a roof are hooked together on a crane hook at a hooking distance. In such embodiments, the hooking distance can be at least 5 cm, particularly at least 10 cm or at least 15 cm, or at most 200 cm, or at most 100 cm, or at most 50 cm larger than a mounting distance between the at least one component and the roof in a mounted state, particularly of an assembling set, wherein in the mounted state the component and the roof are fixed to a base of a nacelle.

In several embodiments, a third length of a third connecting device may be configured such that, in a hooked state of at least one component and a roof with the component and the roof connected by the third connecting device, the component and the roof cannot swing or move relative to the other. Preventing the swinging of a component and a roof relative to the other in a hooked state might prevent the component and the roof from colliding or becoming damaged. For instance, swinging of a component and a roof relative to the other in a hooked state might occur due to different sensitivities of the roof and the component to wind loading.

Figure 7:
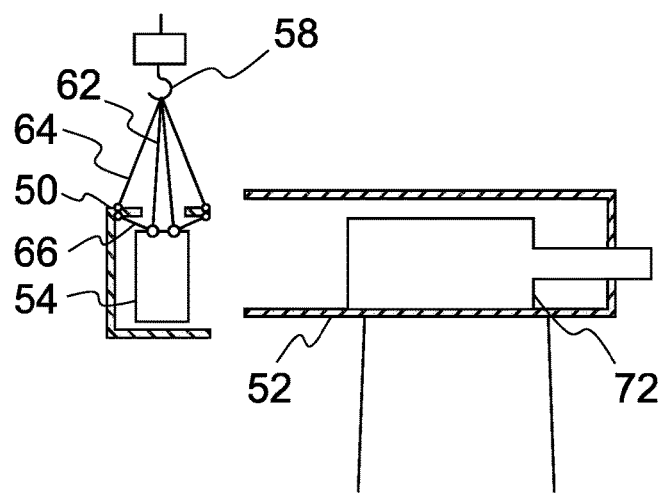
FIG. 7 illustrates a cross-sectional view of a roof of a nacelle and a component during mounting on a base of the nacelle on a tower of a wind turbine according to an exemplary embodiment of the present disclosure.

Referring now to the exemplary embodiment of FIG. 7, a component 54, in particular a transformer of a wind turbine 10, and a roof 50 are lifted for mounting to a base 52 of a nacelle 16, in particular to a rear side of the nacelle 16. As shown in FIG. 7, a further component 72 of the wind turbine 10 may already be fixed to the base 52. The roof 50 may include a part of a rear wall of the nacelle 16 and/or a part of a bottom wall of the nacelle 16.

Figure 8:
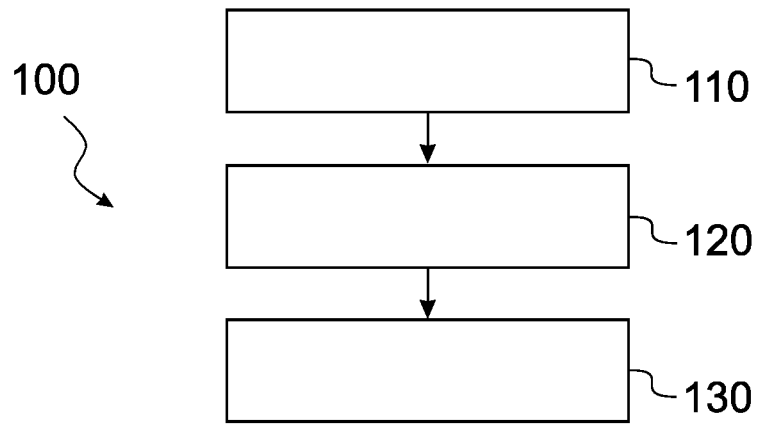
FIG. 8 illustrates a flow diagram of an embodiment of a method of mounting a nacelle of a wind turbine and at least one component of the wind turbine on a tower of the wind turbine according to the present disclosure.

Referring to FIG. 8, a flow diagram of a typical embodiment of a method 100 of mounting a nacelle of a wind turbine, such as the wind turbine 10 of FIG. 1, and at least one component of the wind turbine on a tower of the wind turbine is illustrated. The method 100 includes hooking (block 110) a roof of the nacelle to a crane hook of a crane, and hooking (block 120) the at least one component to the crane hook of the crane. The method 100 further includes lifting (block 130) the roof of the nacelle together with the at least one component using the crane.

Figure 9:
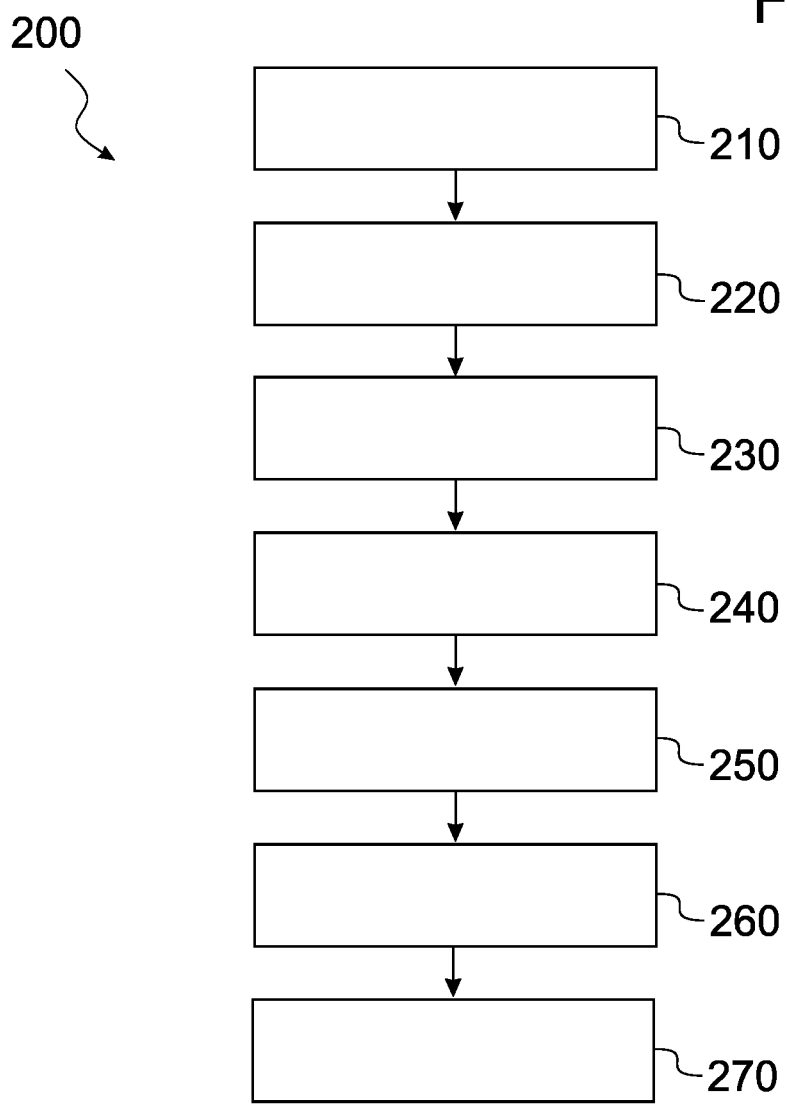
FIG. 9 illustrates a flow diagram of an exemplary embodiment of a method of mounting a nacelle of a wind turbine and at least one component of the wind turbine on a tower of the wind turbine according to the present disclosure.

Referring now to FIG. 9, a flow diagram of an exemplary embodiment of a method 200 of mounting a nacelle of a wind turbine is illustrated. The method 200 includes hooking (block 210) a roof of the nacelle to a crane hook of a crane, and hooking (block 220) a component to the crane hook of the crane.

In some embodiments, hooking a roof to a crane hook can include connecting the roof of the nacelle to the crane hook using a second connecting device, particularly by connecting the second connecting device to a further fastening site on the outside of the roof.

In embodiments, hooking a component to a crane hook can include connecting the component to the crane hook using a first connecting device, wherein the first connecting device reaches through an opening in the roof of the nacelle. Hooking the component to the crane hook can include connecting the roof of the nacelle to the component using a third connecting device, particularly by connecting the third connecting device to a fastening site on the inside of the roof.

In exemplary embodiments, hooking a component to a crane hook can include stabilizing the roof of the nacelle and the component at a hooking distance, wherein the hooking distance is at least 5 cm, in particular at least 10 cm or at least 15 cm, larger than a mounting distance between the roof and the component in the mounted nacelle. In particular, the roof can be stabilized above the component.

In some embodiments, hooking a component to a crane hook can include stabilizing the roof of the nacelle and the component at a hooking distance, wherein the hooking distance is maximum 150 cm, in particular maximum 50 cm or maximum 30 cm, larger than a mounting distance between the roof and the component in the mounted nacelle. "Mounted nacelle" might typically refer to a mounting status in which the nacelle and the wind turbine are ready for normal service.

The method 200 includes lifting (block 230) the roof of the nacelle together with the component using the crane.

In some embodiments, after hooking a component to a crane hook and during lifting, the component and the roof may be in a hooked state, for example as described in conjunction with the exemplary embodiments shown in FIG. 3, 4, 5A, 5B, 6A or 7. In several embodiments, the roof and the component may be lifted from a support surface, e. g. from ground or from a ship, to a base of a nacelle on a tower of a wind turbine. In some embodiments, the roof and the component may be lifted from a base to a support surface.

In some embodiments, the roof may be mounted non-fixedly to the component during at least one of hooking the roof to the crane hook, hooking the at least one component to the crane hook and lifting. In particular, the roof may be mounted non-fixedly to the component in a hooked state. Non-fixedly typically refers to a mounting, using flexible connecting devices such as ropes or slings.

The method 200 can include positioning (block 240) and fixing the component in a base of the nacelle.

In some embodiments, during positioning of a component in a base, the component may be lowered to its designated position in the base and may then be fixed to the base. In particular, the component and the roof may still be separated by the hooking distance or by a distance larger than the mounting distance.

After positioning (block 240) and fixing the component in the base of the nacelle, the method 200 may proceed with positioning (block 250) and fixing the roof on the base.

In exemplary embodiments, during positioning of the roof, the roof may be lowered onto the base, as described e. g. in conjunction with FIG. 6B, and may then be fixed to the base, in particular using a releasable connecting device. A releasable connecting device might allow a roof to be easily removed, for example to repair or to replace a component or a further component of a wind turbine. A releasable connecting device may include a device for positive locking of the roof and the base, or releasable fasteners such as bolts.

The method 200 may include disconnecting (block 260) the component and the roof from the crane hook, in particular disconnecting the first connecting device from the component or from the crane hook and/or disconnecting the second connecting device from the roof or from the crane hook.

The method 200 may include closing (block 270) the opening, particularly using a lid.

In several embodiments of a method according to the present disclosure, in particular, in embodiments directed to the repair or replacement of a damaged component located in a nacelle of a wind turbine, the method can include hooking a roof of the nacelle to a crane hook of a crane and hooking the damaged component to the crane hook. The method may include lifting the roof together with the damaged component from a base of the nacelle on a tower of the wind turbine to a support surface. The method may proceed with further steps of embodiments of the method as described herein, in particular in conjunction with FIG. 8 or FIG. 9, wherein in the further steps the component may be the damaged component after repair or a replacement component.

In embodiments of the method according to the present disclosure, hooking the roof to the crane hook may be performed before hooking the component to the crane hook. In exemplary embodiments, hooking the roof to the crane hook may be performed after hooking the component to the crane hook. In some embodiments, hooking the roof to the crane hook may be performed simultaneously with hooking the component to the crane hook. The order of mentioning the hooking of the roof and the component does not necessarily describe the order of the hooking in described exemplary embodiments. In typical embodiments, the roof and the component are placed under the crane hook, e.g. with spacers or in a mounting distance using a fixation device, before hooking them.

The various embodiments of the method and the assembling set of parts of a wind turbine may advantageously reduce the number of lifting steps required for lifting a component of a wind turbine and a roof of a nacelle to and/or from a tower or base of the wind turbine, in particular to half the number of lifting steps. Furthermore, lifting the component and the roof together can decrease the sensitivity of lifting to wind loading as compared to lifting the roof alone. In particular, decreasing the sensitivity to wind loading can reduce the time and costs associated with lifting the component and the roof, since lifting is less dependent on wind conditions. Decreasing the sensitivity to wind loading can reduce the risk of damaging the roof during lifting.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for mounting a nacelle of a wind turbine and at least one component of the wind turbine on a tower of the wind turbine, the method comprising:
hooking a roof of the nacelle to a crane hook of a crane using a first connecting device attached directly between the roof of the nacelle and the crane hook;
hooking the at least one component to the crane hook of the crane using a second connecting device attached directly between the component and the crane hook; and
lifting the roof of the nacelle together with the at least one component using the crane.

2. The method of claim 1, wherein the hooking steps comprise stabilizing the roof of the nacelle and the at least one component at a hooking distance, wherein the hooking distance is at least 5 cm larger than a mounting distance between the roof and the at least one component in the mounted nacelle.

3. The method of claim 1, wherein the roof is not fixedly mounted to the component during at least one of the hooking the roof to the crane hook or t hooking the at least one component to the crane hook, and the lifting.

4. The method of claim 1, wherein the first connecting device reaches through an opening in the roof of the nacelle.

5. The method of claim 4, further comprising connecting the roof of the nacelle to the at least one component using a third connecting device.

6. The method of claim 1, comprising positioning and fixing the at least one component in a base of the nacelle; and, after fixing the at least one component, positioning and fixing the roof on the base of the nacelle.

7. The method of claim 1, wherein the at least one component comprises at least one or a combination of: a drivetrain, a drivetrain component, a gearbox, a main shaft, a main bearing, a generator, or a transformer.

8. The method of claim 1, wherein the at least one component is heavier than 10 tonnes or is heavier than the roof of the nacelle.

9. The method of claim 1, wherein the roof of the nacelle comprises a fastening site on the inside of the roof.

* * * * *